No. 860,763. PATENTED JULY 23, 1907.
G. M. OLSEN.
VEHICLE COUPLING.
APPLICATION FILED NOV. 1, 1906.

WITNESSES:
D. E. Carlsen.
E. C. Carlsen.

INVENTOR:
George M. Olsen.
BY his ATTORNEY:
A. M. Carlsen.

UNITED STATES PATENT OFFICE.

GEORGE M. OLSEN, OF KENSETT, IOWA.

VEHICLE-COUPLING.

No. 860,763.  Specification of Letters Patent.  Patented July 23, 1907.

Application filed November 1, 1906. Serial No. 341,656.

*To all whom it may concern:*

Be it known that I, GEORGE M. OLSEN, a citizen of the United States, residing at Kensett, in the county of Worth and State of Iowa, have invented certain new and useful Improvements in Vehicle-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle couplings; and the object is to provide an inexpensive, durable and efficient coupling device for coupling together a traction engine and a portable threshing machine, or any other vehicles to be drawn directly or indirectly by the engine. This and other objects I attain by the novel construction and arrangement of parts illustrated in the accompanying drawing in which—

Figure 1:
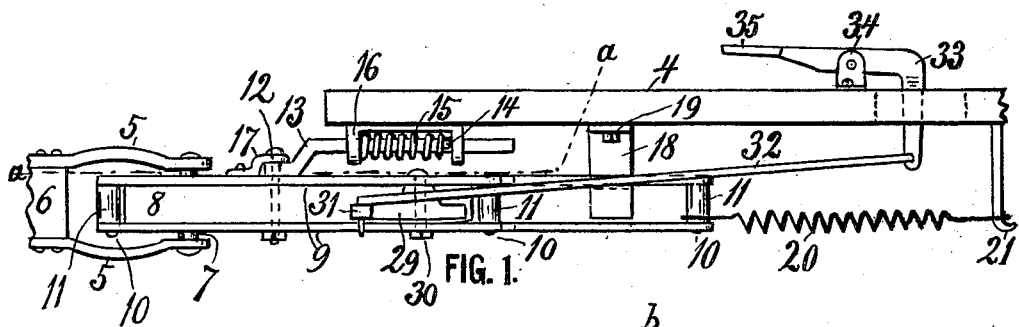
Figure 2:
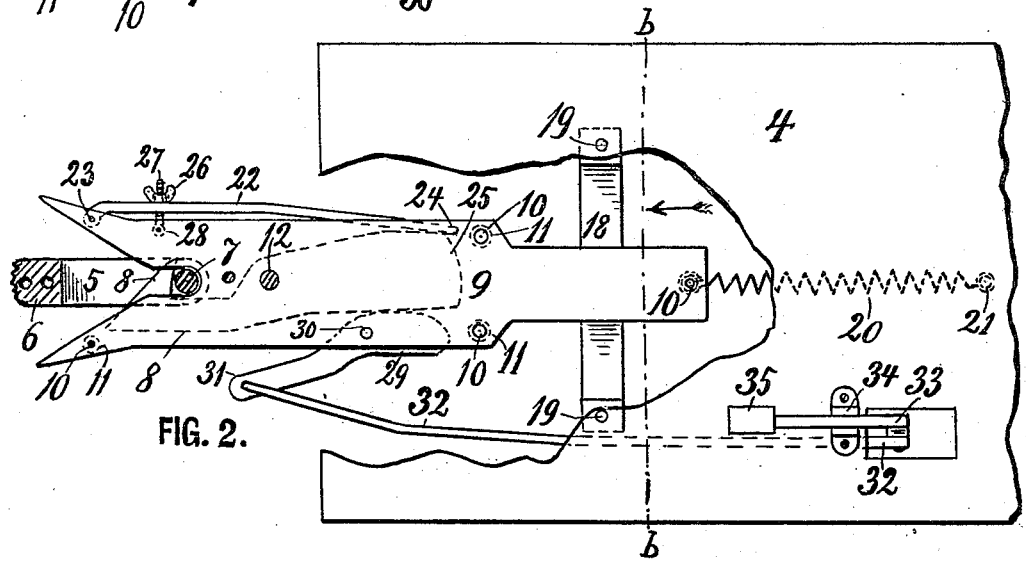
Figure 3:
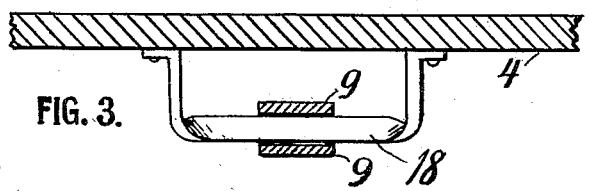

Figure 1 is a side elevation of my new coupling device shown as applied to the adjacent parts of a traction engine and the pole of a vehicle. Fig. 2 is a top view of Fig. 1 with a portion of the platform of the engine broken away and the other parts intersected on the line *a a*. Fig. 3 is a cross section on the line *b b* in Fig. 2.

Referring to the drawing by reference numeral, 4 designates the platform or other rear portion of the traction engine, and 5 is the fork-shaped end of the pole 6 of the vehicle to be drawn by the engine. In the fork 5 is secured a pin 7 adapted for engagement with a hook 8 of the coupling.

The coupling is formed of two plates 9 secured together by rivets 10 and are held the proper distance apart by the tubular studs 11 encircling the rivets, or if so preferred the rivets may be made integral with the studs by reducing the ends of the solid studs to form shoulders which meet the plate when the reduced portion passes through the plate and is riveted over, as any mechanic will understand. In the frame thus formed of the two plates is mounted the coupling hook 8 on a pivot bolt 12, and on said bolt is also pivoted at the upper side of the frame a draw-bar 13, which is offset upwardly from the frame and slidingly retained by a pin 14 and spring 15 in a bracket 16 secured to the platform 4.

17 is a brace to help support the bolt 12 against bending.

18 is a transversely guiding brace or bar passed loosely through the rear end of the coupling frame to guide it, and having its ends bent upwardly and secured at 19 to the platform.

20 is a light spring extending from a hook 21 in the platform to the rear end of the coupling frame, which is thereby normally held with its forward end in a central position while the much stronger spring 15 serves as a cushion for the engine to pull against, for the well known purpose of such springs in couplings.

The coupling hook or jaw 8 is closed by the action of a spring arm 22, pivoted at 23 and pressing with its end 24 against the rear arm 25 of the coupling hook; the tension of said spring arm being created and regulated by the thumb-nut 26 on the screw 27, having its inner end pivoted at 28 in the coupling frame and extending through the spring arm. Against said spring the arm 25 of the hook is impelled by a cam-lever 29, pivoted at 30 and having its long end 31 connected by a rod 32 to a foot-lever 33, mounted in a bracket 34 on the platform in a position convenient for the operator of the engine to put his foot on the arm 35 of the lever, and by pressing down will open the coupling hook and thus uncouple it from the pole, he may do likewise in coupling, but that is not necessary as the pin 7 in the pole will act on the slant of the coupling hook and throw the latter open automatically as the vehicles come together.

Having thus described my invention, what I claim as new, and desire to secure by Letters Patent, is:

In a device of the class described, the combination with a traction engine, of a bracket secured thereto and forming two bearings for a slidable bar, an expanding coil-spring between the bearings, a draw-bar sliding in said bearings and being encircled by the spring and having means for engaging the spring to compress it; the rear end of said draw-bar being offset downwardly, an elongated yoke-shaped frame pivotally suspended from the offset part of the draw-bar, a spring-closed coupling hook pivoted in the frame, a cam lever pivoted in the frame and adapted when swung to open the hook, a rod extending from the cam lever forwardly and a foot-lever mounted on the engine and connected with the rod to operate it, said frame having in its rear end a V-shaped notch in which the coupling hook is exposed for engagement with an eye or like means at the end of a draft pole.

In testimony whereof I affix my signature, in presence of two witnesses.

GEORGE M. OLSEN.

Witnesses:
 OTTO BROWN,
 O. T. HARTWIG.